United States Patent Office 3,251,910
Patented May 17, 1966

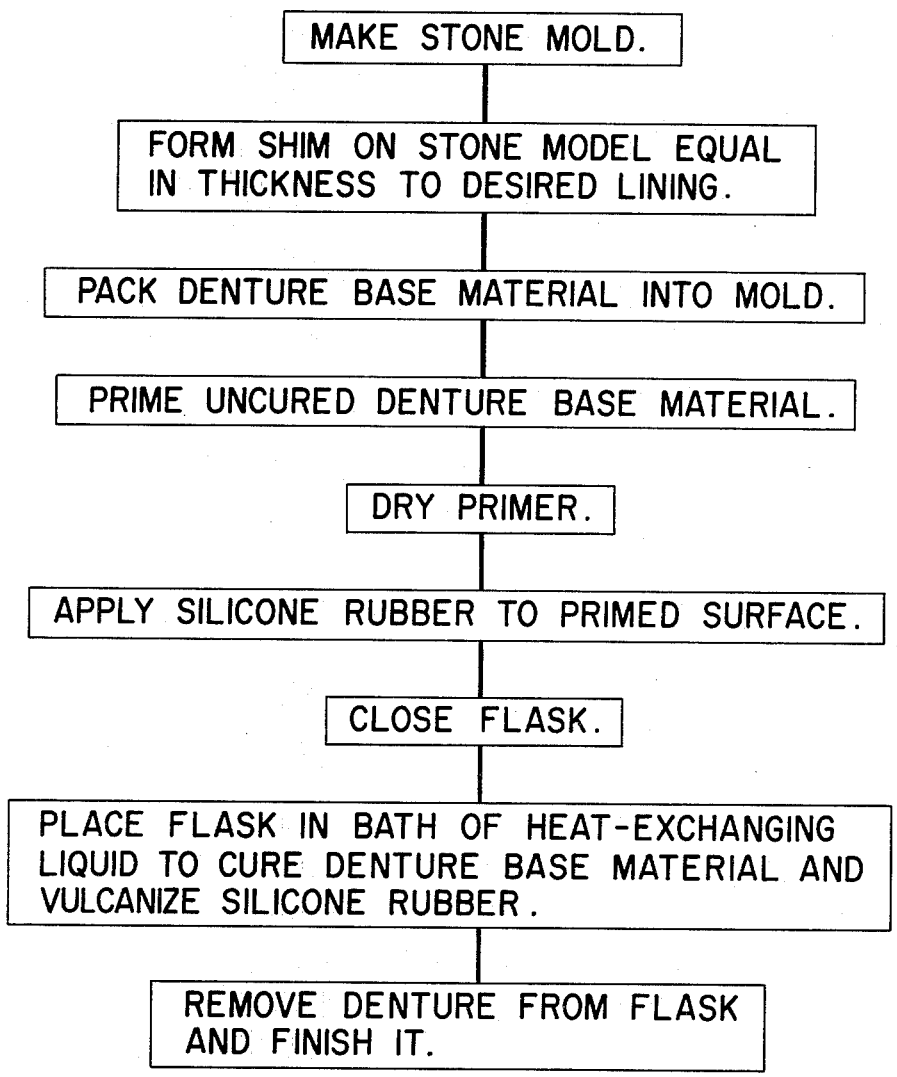

3,251,910
METHOD FOR PREPARING LINED DENTURES
George W. Barnhart, Ogden Dunes, Ind., assignor to Dow Corning Corporation, Midland, Mich., a corporation of Michigan
Filed Jan. 8, 1964, Ser. No. 336,381
5 Claims. (Cl. 264—17)

This invention relates to a method for preparing new dentures lined with silicone rubber.

There are many people for whom the wearing of dentures is an unpleasant necessity. As pointed out by E. A. Harris in his article "A Plea for More Research on Denture-Base Materials" which appeared in The Journal of Prosthetic Dentistry, vol. 11, No. 4, pages 673–676, July-August 1961, this unpleasantness generally is not a result of a poor "fit" but is a question of "comfort." These two terms are in reality not synonymous although denture wearers tend to equate them. In order to make the wearing of dentures more bearable, many owners line their dentures with a resilient material. However, such liners are usually temporary and must be replaced frequently. Examples of cases where resilient liners are particularly useful are: in the complete lower denture where the patient shows a senile atrophy; in developing maximal retention where the residual ridges are bilaterally undercut; in mouths where a hard mediun palatal raphe is associated with a poor retentive potentiality; in obturators for acquired and congenital clefts of the palate; and where hypersensitivity exists, as in the case of irradiated tissue. Harris stated in the aforementioned article that, "If there was a material for cushioning dentures (similar to the temporary liner) that would retain those soft, compatible properties as long as one year, most of the chronic complaints in denture service would be eliminated." The dental profession considers that the essential characteristics of a soft liner should include: (1) insolubility or very little solubility in the mouth environment, (2) adhesion to, and no serious effect on the denture base, (3) permanent softness and resiliency, (4) low water absorption, (5) small dimensional change during processing, (6) ease of cleaning combined with good abrasion resistance, (7) color stability and (8) satisfactory tissue tolerance.

It is an object of this invention to provide a method for preparing new dentures having a permanent silicone rubber lining. Another object is to provide dentures containing a soft, resilient, lining which overcomes the disadvantages of the prior art products. Other objects and advantages of this invention will be apparent from the following description, examples and claims.

More specifically, this invention relates to an improvement in a method for making a new denture lined with a silicone rubber, the improvement comprising curing the denture base material and vulcanizing a room temperature vulcanizable silicone rubber while in contact with each other.

This invention also relates to a method for making a new denture lined with a silicone rubber comprising the steps of (1) making a stone model, (2) forming a shim having the desired thickness of the eventual silicone rubber lining on the stone model in its half of the processing flask, (3) packing an acrylic denture base material into the mold cavity, (4) priming the surface of the uncured acrylic, (5) allowing the primer to dry while removing the shim from the stone model, (6) applying a room temperature vulcanizable silicone rubber to the primed acrylic surface, (7) closing the flask until there is metal to metal contact, (8) placing the closed flask in a bath of a heat-exchanging liquid at a sufficient temperature and for a sufficient time to cause the acrylic to cure and the silicone rubber to vulcanize, and (9) removing the silicone rubber lined denture from the flask and finishing it. This method is illustrated by the flow sheet in the drawing.

The foregoing method can be more fully illustrated as follows: The wax model denture is constructed in the conventional manner, invested in the processing flask, the wax boiled out and a liquid foil separating agent painted onto the mold surfaces of the flask half containing the teeth. Prior to packing the acrylic denture base material into the mold, a shim having the desired thickness of the eventual silicone rubber liner is formed on the stone model in its half of the flask using a material such as a dental base plate wax. Usually a shim of 1½ to 2 millimeters in thickness is sufficient. This wax shim is formed so as to achieve the desired peripheral juncture of the liner to the finished denture material. The careful and precise formulation of this shim cannot be overemphasized for care and craftsmanship employed here will reduce to a minimum the eventual finishing of the juncture of hard and soft materials in the completed denture. As will be obvious, employing this technique any portion of the denture or all of the denture can be lined. The shim is formed accordingly. With the desired shim formed on the model, the acrylic denture base material is packed into the mold cavity. The acrylic denture base material should be handled with a clean sheet of polyethylene plastic, cellophane or some similar material. The use of a clean sheet is to be emphasized since normal skin oils, resulting from direct hand contact, can cause poor bonding between the acrylic denture base material and the silicone rubber liner. After the initial packing, a new sheet of material is positioned between the acrylic denture base material and the shim to prevent their contact during trial packing. During trial packing it may be necessary to reduce the thickness of the shim in areas where the acrylic denture base material appears to be very thin. The surface of the uncured acrylic denture base material is then primed. Only a light even coat is required. Flooding the surface with primer serves no useful purpose. The primer can be applied by any suitable means such as by brushing or spraying it onto the surface. Once the primer is applied it must then be allowed to dry. There appears to be no critical drying time but generally between 5 and 15 minutes seems to give optimum results. While the primer is drying, the shim is removed from the stone model and the model and land area of the lower half of the flask are brushed with a separating agent such as a 10% aqueous solution of a mild detergent such as Tide or Dreft. The room temperature vulcanizable silicone rubber is then applied to the primed acrylic surface. Sufficient silicone rubber is employed so that there is a slight overloading of the space created by the shim. This is done to preclude the trapping of air or the formation of voids. The flask halves are then closed together until there is metal to metal contact, the flask placed in its processing press or clamp, and then introduced into a bath of a heat-exchanging liquid such as water. The bath temperature must be sufficient to cause the acrylic denture base material to cure. With the currently available materials, a bath temperature of about 165° F. is generally employed. The time required for the acrylic to cure is about 9 hours, however, the flask can be left in the bath overnight if so desired. The foregoing is the preferred curing procedure. Various short cure techniques can be employed but generally they are not recommended. For example, cure can be obtained by heating for 1½ hours in the 165° F. bath and then for ½ hour in a 212° F. bath. However, such a technique tends to leave a residual monomer in the acrylic which can cause tissue reaction and the optimum bond between the acrylic and the silicone rubber usually is not obtained so such a technique is not preferred. As the acrylic denture base material is curing, the silicone rubber vulcanizes, and the two materials become bonded together. When processing has been completed the flask halves are parted and the denture recovered. The thin flask of silicone rubber from the excess employed can be trimmed away with a small, sharp scissors, surgical blade or a dental arbor band. Additional finishing of the juncture between the acrylic and silicone rubber can be done with an arbor band, berlew disk, or mounted abrasive stones and points. Generally speaking, finishing the silicone rubber liner at the periphery should be done with the highest speed instrument possible and in such a direction that the liner is backed with hard base material. Conventional techniques are used to finish and polish the acrylic resin portion of the denture.

The terms "cure" and "curing" as employed herein are used in the generic sense as by the dental profession to define the hardening process of a denture base material, as by polymerization, vulcanization or fusion.

Generally speaking, methyl methacrylate is the preferred material employed to make the denture. However, the term "acrylic" as employed herein is intended to cover any of the conventional related denture base materials which can be used to make the denture. Such materials are well known to those skilled in the art and are adequately described elsewhere in the literature so no useful purpose would be served by discussing them in detail here.

Any suitable primer can be used to prime the surface of the acrylic material. The purpose of the primer is to improve the bond between the acrylic and the silicone rubber. While the use of a primer is not believed to be essential to obtain satisfactory bonding, it is preferable to employ one. Many suitable primers will be obvious to those skilled in the art. Examples of a few preferred primers are (1) allyltrimethoxysilane, (2) allyltriacetoxysilane and (3) a copolymer prepared from about 90 mol percent methyl methacrylate and about 10 mol percent of

$$(CH_3O)_3SiCH_2CH_2CH_2OOCC(CH_3)=CH_2$$

The room temperature vulcanizable silicone rubbers that can be employed in making the denture are likewise well known to those skilled in the art and hence will not be discussed in detail here. Either one or two component room temperature vulcanizable silicone rubbers can be employed but the one component rubbers are preferred because they do not require mixing prior to use. Examples of suitable room temperature vulcanizable rubbers are found in U.S. Patents 2,927,907; 3,035,016; 3,061,567; and 2,833,742. For obvious reasons, only medical grade materials should be employed.

In order that those skilled in the art can better understand how the present invention can be practiced, the following examples are given by way of illustration and not by way of limitation. All parts and percents referred to herein are by weight unless otherwise specified. All viscosities were measured at 25° C. unless otherwise specified.

*Example 1*

A full lower denture lined with silicone rubber was prepared as follows: A wax model of the denture was constructed in the usual manner, invested in the processing flask, the wax boiled out and a liquid foil separating agent painted onto the mold surfaces of the flask half containing the teeth. A shim about 2 mm. thick was carefully formed on the stone mold in its half of the flask using a dental base plate wax. Methyl methacrylate was placed and packed into the mold cavity using a clean sheet of polyethylene. Then a light even coat of primer was applied to the surface of the uncured methyl methacrylate and allowed to dry for about 10 minutes. While the primer was drying, the shim was removed from the stone model and the model and land area of the lower half of the flask were brushed with a 10% aqueous solution of Tide. A room temperature vulcanizable silicone rubber consisting essentially of 100 parts of a 10,000 cs. hydroxy-endblocked polydimethylsiloxane polymer, 40 parts of a 1,000 cs. polydimethylsiloxane fluid, 20 parts of a silica filler and 7 parts of methyltriacetoxysilane was then applied to the primed surface in such quantity so that there was a slight overloading of the space created by the shim. The flask halves were then closed together until there was metal to metal contact, the flask placed in its clamp and then introduced into a water bath. The temperature of the water was raised to 165° F. and the flask allowed to remain in the bath overnight. The following morning the flask was removed from the bath and allowed to cool. The flask halves were then parted and the lined denture removed. The thin flask formed from the excess silicone rubber was trimmed away with a small, sharp scissors and then the juncture between the silicone rubber and the denture base finished with an arbor band. The acrylic portion of the denture was then finished and polished in the usual manner.

*Example 2*

Full lower dentures were made employing the method of Example 1 except that the room temperature vulcanizable silicone rubbers consisting essentially of the ingredients specified below were substituted for the silicone rubber used in Example 1.

(1) 140 parts of a 10,000 to 15,000 cs. hydroxy-endblocked and partial trimethylsilyl-endblocked polydimethylsiloxane polymer, 14 parts of a silica filler, 0.5 part of a pigment paste, 10 parts of vinyltri-(methylethyloxime)-silane and 0.2 part stannous oleate.

(2) 140 parts of a 10,000 to 15,000 cs. hydroxy-endblocked and partially trimethylsilyl-endblocked polydimethylsiloxane polymer, 14 parts of a silica filler, 10 parts of methyltriacetoxysilane, 0.2 part stannous oleate and 3 parts of a pigment paste.

(3) 100 parts of a 12,500 cs. hydroxy-endblocked polydimethylsiloxane polymer, 40 parts of a 1,000 cs. polydimethylsiloxane fluid, 31.5 parts of a treated silica filler, 9.5 parts of methyltriacetoxysilane, 0.5 part of a pigment paste and 0.2 part of stannous oleate.

(4) 100 parts of a 40,000 cs. hydroxy-endblocked polymethyltrifluoropropylsiloxane polymer, 15 parts of a 1,000 cs. polymethyltrifluoropropylsiloxane fluid, 13.5 parts of a treated silica filler, 10 parts of methyltriacetoxysilane, 0.25 part of stannous oleate and 3 parts of a pigment paste.

*Example 3*

Full upper dentures as well as partial upper and lower dentures have been made lined with silicone rubber employing the method of Example 1 and the silicone rubber compositions of Examples 1 and 2.

That which is claimed is:

1. In a method for making a new denture lined with a silicone rubber, the improvement comprising placing a room temperature vulcanizable silicone rubber in contact with the denture base material and thereafter curing the denture base material and vulcanizing the silicone rubber while in contact with each other.

2. The method of claim 1 wherein the denture base material is an acrylic material.

3. The method of claim 2 wherein the denture base material is methyl methacrylate.

4. A method for making a new denture lined with a silicone rubber comprising the steps of
   (1) making a stone mold,
   (2) forming a shim having the desired thickness of the eventual silicone rubber lining on the stone model in its half of the processing flask,
   (3) packing an acrylic denture base material into the mold cavity, (4) priming the surface of the uncured acrylic,
(5) allowing the primer to dry while removing the shim from the stone model,
(6) applying a room temperature vulcanizable silicone rubber to the primed acrylic surface,
(7) closing the flask until there is metal to metal contact,
(8) placing the closed flask in a bath of a heat-exchanging liquid at a sufficient temperature and for a sufficient time to cause the acrylic to cure and the silicone rubber to vulcanize, and
(9) removing the silicone rubber lined denture from the flask and finishing it.

5. A method for making a new denture lined with a silicone rubber comprising the steps of
(1) making a stone mold,
(2) forming a shim, using a dental base plate wax, having the desired thickness of the eventual silicone rubber lining on the stone mold in its half of the processing flask,
(3) packing methylmethacrylate into the mold cavity,
(4) priming the surface of the uncured methylmethacrylate,
(5) allowing the primer to dry while removing the shim from the stone model,
(6) applying a room temperature vulcanizable silicone rubber to the primed methyl methacrylate surface,
(7) closing the flask until there is metal to metal contact,
(8) placing the closed flask in a water bath at a temperature of about 165° F. for at least 9 hours whereby the methyl methacrylate is cured and the silicone rubber vulcanized, and
(9) removing the silicone rubber lined methyl methacrylate denture from the flask and finishing it.

References Cited by the Examiner

UNITED STATES PATENTS

| 2,466,727 | 4/1949 | Morgan | 32—2 |
| 2,851,734 | 9/1958 | Schnell et al. | 264—17 |
| 2,934,823 | 5/1960 | Preis | 32—2 |

FOREIGN PATENTS

| 572,323 | 1/1958 | Italy. |

ALEXANDER H. BRODMERKEL, *Primary Examiner.*

B. SNYDER, *Assistant Examiner.*